Figure 1:
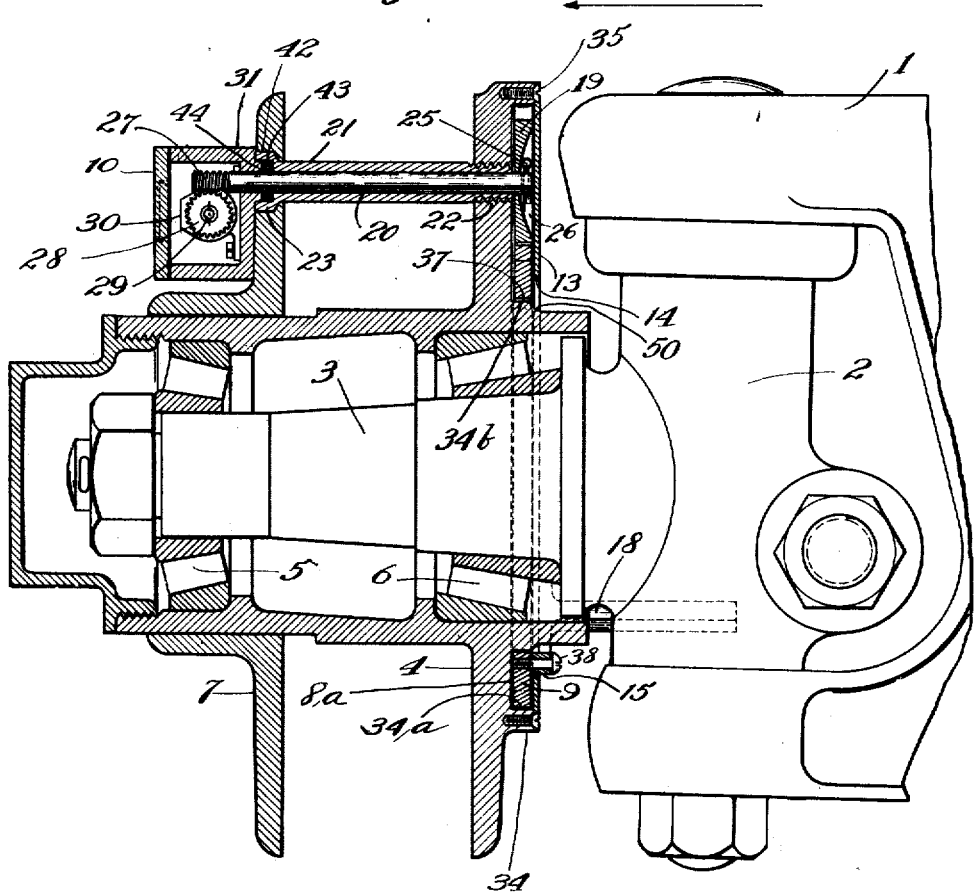

H. P. C. BROWNE.
ODOMETER OPERATING MEANS.
APPLICATION FILED SEPT. 8, 1916.

1,265,042.

Patented May 7, 1918.
4 SHEETS—SHEET 1.

WITNESSES:

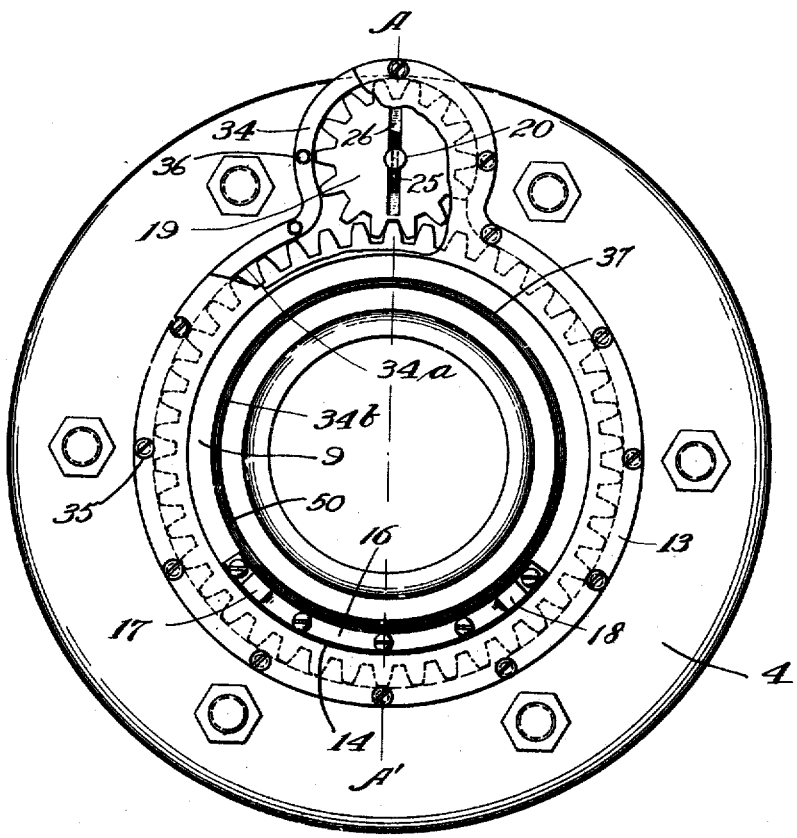

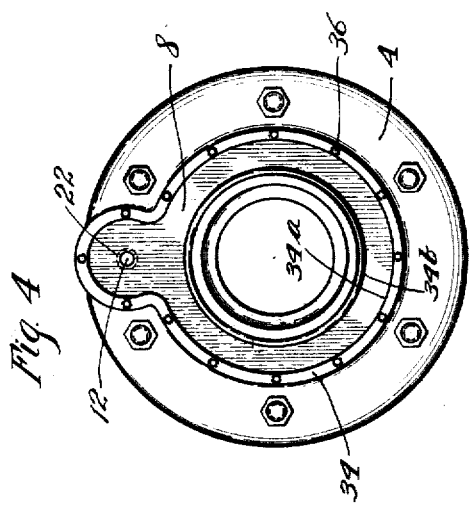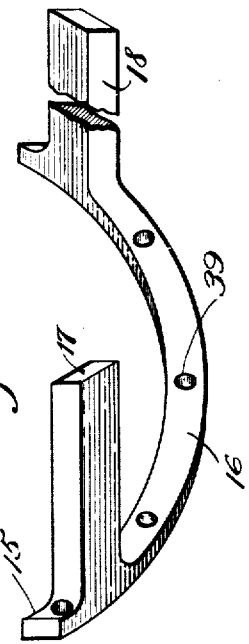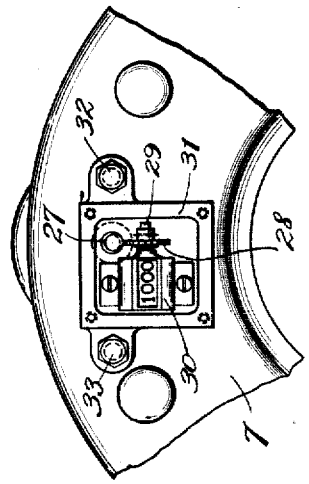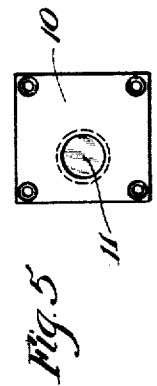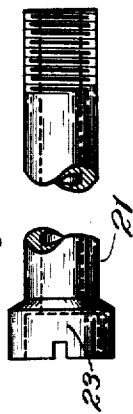

H. P. C. BROWNE.
ODOMETER OPERATING MEANS.
APPLICATION FILED SEPT. 8, 1916.
1,265,042.
Patented May 7, 1918.
4 SHEETS—SHEET 4.
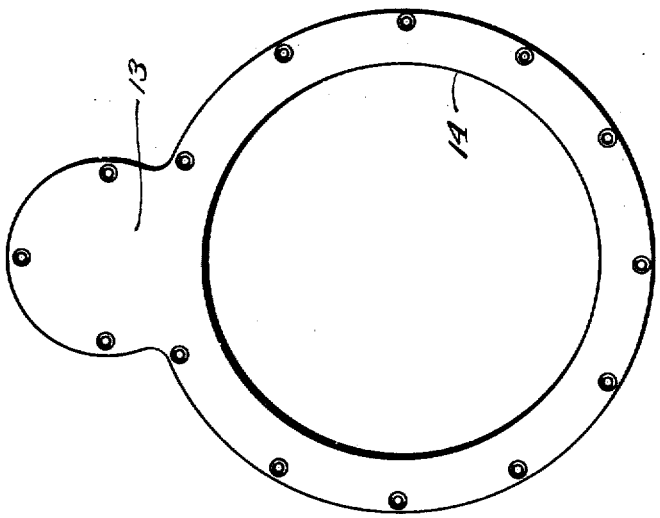
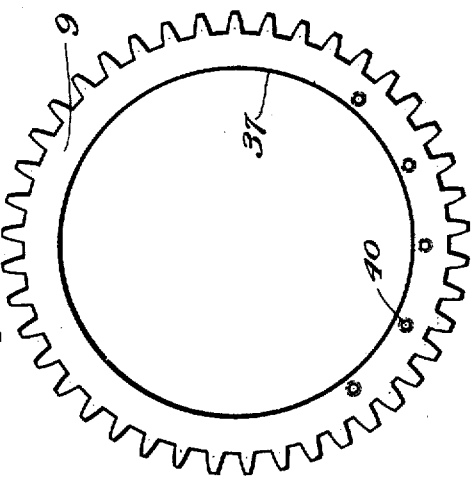
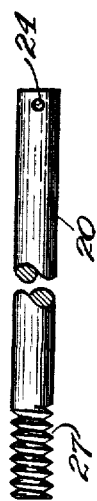
WITNESSES:
INVENTOR

UNITED STATES PATENT OFFICE.

HARRY P. C. BROWNE, OF NEW YORK, N. Y.

ODOMETER-OPERATING MEANS 1,265,042.         Specification of Letters Patent.         Patented May 7, 1918.

Application filed September 8, 1916. Serial No. 119,073.

*To all whom it may concern:*

Be it known that I, HARRY P. C. BROWNE, a citizen of the United States, residing at New York, in the county and State of New York, have invented certain new and useful Improvements in Odometer - Operating Means; and I do hereby declare the following to be a full, clear, and exact description of the invention, such as will enable others skilled in the art to which it appertains to make and use the same.

My invention relates to improvements in an apparatus for operating any rotation indicating, or registering instrument, by imparting a measure of the relative rotation between a shaft or an axle and a wheel journaled thereon, to such an instrument mounted on the wheel.

One of the important objects of my invention is the provision of means for installing any of said or analogous instruments upon a vehicle wheel, in a position sheltered from chance collision and in which position the instrument shall be readily accessible from the outer side of the wheel for reading or other attention.

Another object of my invention is the provision of inclosed driving means for instruments, mounted as above and requiring simple and direct high speed actuation.

To the accomplishment of these objects and such others as may hereinafter appear, my invention comprises the novel construction and combination of parts hereinafter described and pointed out in the appended claims, reference being had to the accompanying drawings.

In the drawings, in which the same reference characters designate like parts throughout the several views, Figure 1 is a vertical section of an automobile front wheel-hub, with an outline of the steering knuckle and stub on which the hub is mounted; the section being taken on the line A—A' of Fig. 2. Fig. 2 is a rear elevation of the hub, removed from the axle-stub, and seen in the direction of the arrow, Fig. 1. Fig. 3 is a portion only of the wheel-hub, seen from the front in the direction opposite to the arrow, and shows only the location and mounting of the counter and its housing. Fig. 4 is an elevation of the wheel-hub, the same as shown in Fig. 2, but on a reduced scale, in which all parts of the odometer operating train are removed to show more clearly the recess formed on the hub. Fig. 5 shows the cover of the counter housing. Fig. 6 is a side elevation of a bushing through which the operating train communicates from the rear to the front of the wheel. Fig. 7 is an isometric view of a yoke or fork used for coupling the operating train to the steering knuckle. Fig. 8 is an elevation of the main driving gear of the train; Fig. 9 is an elevation of a plate forming one side of a recess containing the driving train gear and pinion; and Fig. 10 is a view of the shaft which transmits the movement of the train from the rear to the front of the wheel. In the drawings, the wheel spokes and flange bolts are omitted for the sake of clearness.

Referring to the drawings, 1 in Fig. 1, represents an automobile-axle steering head, of which 2 is the pivot and 3 the axle stub, upon which stub is mounted, by means of roller bearings indicated at 5 and 6, a wheel-hub of the standard artillery type, comprising an interior flange 4, and an exterior flange 7. Upon the rear vertical face of flange 4 is formed a shallow cavity 8, Fig. 4, preferably by raising an outer rim 34 approximating in outline the numeral 8, and formed by the intersection of two circles, one of which has its center in the hub-axis, the other having its center outside the first circle at a point 12. The interior wall or side 8ª, Fig. 1, is a smooth plane surface substantially parallel to the plane of rotation of the vehicle wheel. A cover 13, Fig. 9, incloses the double recess thus formed, screws 35 in the tapped holes 36, serving to secure the cover in place as shown in Fig. 2, in which the cover is shown with a corner broken away to disclose the spur gear 9 and the pinion 19, incased in operative position within the inclosure thus formed. A race 34ª concentric with and parallel to the wheel axis is formed on the inner side of the lower circle and journals the gear 9 upon its gear teeth about the wheel axis as a center. In the embodiment of the invention shown, a shoulder 50, within and concentric with the race 34ª, is formed by the race 34ᵇ, which fits the hole 37 of gear 9, and provides a supplementary journaling therefor. The race 34ᵇ mitigates the wear upon the teeth, and the shoulder 50 forms a fourth side of the casing, thereby contributing additional protection against the entrance of foreign matter. The gear 9 fits within the lower section of the recess 8 with a slight amount of lateral play, its thickness being a little less than the depth of the recess 8; and thus may turn with perfect freedom within the recess but cannot otherwise vary appreciably from a fixed relation to the wheel-hub. An inner portion of the gear body extends within the large circular opening 14 of the cover, and mounts the fork 15, Fig. 7, by means of screws 38 in the holes 39 and engaging tapped holes 40 of the gear. The fork 15 comprises an arch section 16 of inner radius corresponding to that of hole 37, and arms 17 and 18 projecting normally therefrom and spaced apart to embrace loosely the pivot 2, or such other stationary part of the vehicle as may be convenient. The upper section of recess 8 is occupied by the spur pinion 19, in mesh with and of substantially the same thickness as the gear 9. The function of the recess with respect to the pinion is that of furnishing a dust proof casing, the pinion being rotatably supported by the shaft 20. Races for journaling the pinion 19 are therefore omitted but in the embodiment of the invention shown, the sides of the recess are made use of to position and guide the pinion and shaft laterally. This use however is optional and adopted for convenience only, as it is obvious that arrangements can be made whereby the pinion shall be positioned by the shaft 20 exclusively without recourse to the sides or rims of the recess.

An elongated bushing 21, shown in Fig. 6, communicates through the front flange 7 to the recess 8 of the interior flange 4, in which it engages the screw threads indicated at 22 formed on the point 12 as a center. Journaled within the bushing is a shaft 20, shown in Fig. 10, one end of which fits with a slight looseness within a central hole in the pinion 19. A cotter pin 25, lying in a diametrical slot 26 across the face of the pinion, passes into a hole 24 near the end of the shaft, and thus keys the shaft and pinion loosely together. It is to be noted that this construction provides an effective, simple connection of shaft to pinion, which obviates any cramping effect between them which might otherwise be occasioned by an oblique set of the bushing 21 with respect to the plane of rotation of the pinion. As the shaft and pinion are restrained from drift by the sides of the recess, the cotter 25, although loose in the keyway 26, cannot become disengaged therefrom, and effects a dependable means for driving the shaft by the pinion.

At the other end of the shaft 20 is formed a worm thread 27, which engages a worm gear 28, attached to the shaft 29 of an odometer counting mechanism 30. A housing 31 mounted on the exterior flange and attached thereto by bolts indicated at 32 and 33 contains the counter and immediate train; and is sealed by a cover-plate 10, having a glazed window 11 through which the reading of the counter may be viewed.

At is outer end the bushing 21 is provided with an enlarged section 23, fitting a hole 42 in the flange 7, opposite to the center 12 of flange 4. Within the head 23, the bore of the bushing is increased to accommodate an annular section of packing 43, which is compressed by the boss 44 of the housing which fits within the enlarged opening when the housing is in place. Thus oil or other foreign matter is excluded from the housing where its presence would be harmful.

The action of the device is obvious. As the wheel-hub revolves, the immobility of the gear 9, due to the engagement of the pivot 2 by the fork 15, causes the pinion 19 to rotate about its individual center and so communicate to the counter the desired measure of the revolutions of the vehicle wheel.

By the arrangement and construction of the parts substantially as shown, the operating train of the device is protected by the casings from any likelihood of becoming clogged or disconnected by chance blows, mischievous interference, roadway grit or other injurious agencies to which exposed parts are subject. Further, the consolidation of all parts of the device into a single unitary structure incorporated within the wheel-hub, obviates the difficulties arising from lateral displacement between the wheel and axle, and the unsatisfactory results usually obtained in the use of bracketed bridging devices commonly employed between the vehicle wheel and axle. It is to be noted that the counting mechanism is also protected from chance collision by its location against the face of the front flange, in which it is overhung by the outer part of the wheel structure as this is ordinarily arranged.

The details of construction may be varied to suit different conditions of use, and the invention, therefore, is not limited to the construction shown; but what I claim as my invention and desire to secure by Letters Patent of the United States, is;

1. In a device of the class described: an axle; a wheel journaled upon the axle; registering means carried by the wheel; a gear loosely mounted upon the wheel; a part, containing a recess fitting said gear, upon the wheel; means for restraining the rotation of the gear; and means operated by the gear for actuating the registering means.

2. In a device of the character described: an axle; a wheel journaled upon the axle; registering means carried by the wheel; a plane surface formed upon the wheel and parallel to the plane of rotation of the wheel; a rim of uniform height formed upon the wheel and inclosing and perpendicular to said plane surface; a cover fitting on the top of the rim; a gear loosely fitting the cavity formed by the plane surface, rim and cover; means for restraining the rotation of the gear; and means operated by the gear for actuating the registering means.

3. In a device of the class described: an axle; a wheel journaled upon the axle; registering means carried by the wheel; a part containing a recess, upon the wheel; said recess comprising a plane side parallel to the plane of rotation of the wheel, a rim of uniform height inclosing and perpendicular to the plane side, and a cover fitting on the top of the rim; a ring within the recess; gear teeth disposed on the outer periphery of the ring; and means operated by the gear teeth for actuating the registering means: the said gear teeth riding on the rim and loosely mounting the ring in the recess; and the said plane side and said cover positioning the ring laterally.

4. In a device of the class described: an axle; a wheel journaled upon the axle; registering means carried by the wheel; a part containing a recess, upon the wheel; said recess comprising a plane side parallel to the plane of rotation of the wheel, an outer rim of uniform height inclosing and perpendicular to the plane side, a cover fitting on the top of said rim, a like inner rim uniformly distant from the outer rim; a gear loosely fitting said recess; with means operated by said gear for actuating the said registering means.

5. In a device of the class described: an axle; a wheel journaled on the axle; registering means carried by the wheel; a part containing a recess, upon the wheel; a gear-wheel within said recess; lateral guides in said recess for journaling the gear-wheel upon the wheel; an extension to said recess; a cover for said recess and extension; a second gear-wheel inclosed in said extension by the cover, and in mesh with the first named gear-wheel; lateral guides for the second named gear-wheel in said extension; and a spindle for rotatably supporting the second named gear-wheel, and for actuating the registering means.

6. In a device of the class described: an axle; a wheel journaled upon the axle; a gear journaled upon and co-axial with the wheel; a second gear carried by the wheel in mesh with the first named gear; a bushing crossing the wheel upon the axis of the second named gear; a spindle in said bushing; flexible connection between the second named gear and said spindle; with operative connection between the registering means and said spindle.

In testimony whereof I affix my signature in presence of two witnesses.

HARRY P. C. BROWNE.

Witnesses:
MARGARET BROWNE,
K. B. AULT.

Copies of this patent may be obtained for five cents each, by addressing the "Commissioner of Patents, Washington, D. C."